United States Patent [19]

Lahourcade et al.

[11] 4,056,513

[45] Nov. 1, 1977

[54] PROCESS FOR THE PREPARATION OF TERPENE-PHENOL RESINS BY THREE-STAGE REACTION OF PHENOL WITH CARENE USING FRIEDEL-CRAFTS OR LEWIS ACID CATALYST

[75] Inventors: Bernard Lahourcade; Gustave Bonneau, both of Vielle-St Girons, France

[73] Assignee: Les Derives Resiniques et Terpeniques, Dax, France

[21] Appl. No.: 660,024

[22] Filed: Feb. 20, 1976

[30] Foreign Application Priority Data

Mar. 11, 1975 France .................................. 75.07480

[51] Int. Cl.² ............................................... C08L 65/00
[52] U.S. Cl. ................................ 260/62; 260/47 UA; 260/47 R
[58] Field of Search ............... 260/62, 47 UA; 528/91

[56] References Cited

U.S. PATENT DOCUMENTS 3,383,362   5/1968   Gonzenbach .......................... 260/62

*Primary Examiner*—Harry Wong, Jr.
*Assistant Examiner*—Peter F. Kulkosky
*Attorney, Agent, or Firm*—Young & Thompson

[57] ABSTRACT

This invention relates to a process for the preparation of improved terpene-phenol resins particularly useful in the field of adhesives, comprising:

a. reacting 1 molar proportion of a phenol having at least 2 reactive sites with 0.4–0.6 molar proportion of a carene, in the presence of an acidic condensation catalyst;

b. reacting the reaction product obtained in step (a) with 0.4–0.6 molar proportion of said carene in the presence of said catalyst, and c. subsequently reacting the material obtained in step (b) with a reactive terpene, the molar ratio between said reactive terpene and the amount of carene added in step (b) being comprised between 0.5 and 5.

8 Claims, No Drawings

PROCESS FOR THE PREPARATION OF TERPENE-PHENOL RESINS BY THREE-STAGE REACTION OF PHENOL WITH CARENE USING FRIEDEL-CRAFTS OR LEWIS ACID CATALYST

This invention relates to a process for the preparation of improved terpene-phenol resins particularly useful in the field of adhesives.

A number of processes for the preparation of terpene-phenol resins have already been described and, particularly, Indian Pat. No. 126,350 discloses a process for the preparation of a terpene-phenol resin by reaction of $\Delta^3$-carene with a phenol in the presence of a Friedel-Crafts type catalyst. However, the prior processes, and typically the process disclosed in the above Indian patent, do not make it possible to obtain the resins in a satisfactory yield when it is desired to achieve an ultimate product having excellent color and softening point properties, particularly due to the poor reactivity of the carenes.

Applicant has now discovered that when the reaction of a phenol with a carene is effected under specific conditions, it is possible to obtain a clear resin which is very readily soluble in most organic solvents and which is readily compatible with many elastomers and synthetic resins and which, in view of its thermal stability and its resistance to oxidation, is particularly valuable for use in the field of adhesives.

Thus, this invention relates to a process for the preparation of terpene-phenol resins by reaction of a carene with a phenol in the presence of an acidic condensation catalyst, comprising:

a. reacting 1 molar proportion of a phenol having at least 2 reactive sites with 0.4–0.6 molar proportion of a carene, in the presence of an acidic condensation catalyst;

b. reacting the reaction product obtained in step (a) with 0.4–0.6 molar proportion of said carene, in the presence of said catalyst, and c. subsequently reacting the material obtained in step (b) with a reactive terpene, the molar ratio between said reactive terpene and the amount of carene added in step (b) being comprised between 0.5 and 5.

According to another feature of this invention, the residual catalyst present, if any, is removed from the product obtained in step (c).

Other features and advantages of this invention will be apparent from the following detailed description.

The process according to this invention for the preparation of terpene-phenol resins comprises first reacting a phenol with a carene in a two-step reaction, the first step comprising reacting the entire amount of phenol with about one-half the amount of carene in the presence of a catalyst, the second half of the amount of carene being subsequently reacted with the condensation product obtained in the first step in the presence of said catalyst. The resulting phenol-carene resin is then reacted with a reactive terpene, to give the desired improved resin.

The phenol used in this process should have at least two reactive sites available for the condensation, i.e., two free positions with respect to the phenolic OH group. Useful phenols include ordinary phenol (hydroxy benzene), the cresols, the xylenols and thymol, the more generally used and more economic phenol being ordinary phenol which contains three reactive sites.

Useful carenes include $\Delta^3$-carene and $\Delta^2$-carene in a pure state, or a carene derived from pine-resin oils or oils from papermaking plants. In the latter case, it was found that it was not absolutely necessary that the oil be submitted to an extensive deodorizing treatment because the presence of trace sulfide does not affect the production of the resins. It is necessary, however, to use a stripped material, i.e., from which the light malodorous mercaptan fraction, an $\alpha$-pinene fraction and a heavy bottom fraction have been removed.

By pure $\Delta^3$-carene is meant here a material having a chromatographic purity in excess of 95%.

The preferred carene to be used in the process of this invention is $\Delta^3$-carene in pure form and as a stripped carene fraction containing 55–95% carene.

Such a fraction may have the following composition, for example:

| | |
|---|---|
| $\alpha$-pinene | 0.3% |
| $\beta$-pinene | 3.4% |
| $\Delta^3$-carene | 76% |
| Dipentene | 11.7% |
| Other monocyclic hydrocarbons | 6.5% |
| paracymene | 2.1% |

In the first condensation step, one molar proportion of the phenol is reacted with 0.4–0.6 molar proportion of carene, to give a diphenolterpene.

This reaction is preferably conducted at a temperature of 80°–120° C, advantageously of 90°–110° C, in the presence of a condensation catalyst of Lewis acid or Friedel-Crafts type. The preferred catalyst is boron trifluoride used as such or as one of its usual (acetic, ethereal or phenolic) complexes.

Addition of the carene may be effected at any temperature within the range from 20° to 100° C, preferably from 60° to 70° C. The reaction itself is effected at 80°–120° C, preferably at 90°–110° C and is conducted for a period of time sufficient (generally of about 2 hours) to give the desired diphenol-carene.

The reaction between the phenol and the carene is generally effected within a suitable solvent such as an aromatic hydrocarbon, typically toluene or xylene.

The reaction should be effected with dry reagents free from peroxide, hydroperoxide and metal salts or oxides, such as iron oxide.

To prevent any addition of water, the various reactions of the process are preferably effected under an inert gaseous atmosphere, such as nitrogen, carbon dioxide or argon, for example.

On completion of the first step, 0.4–0.6 molar proportion of the carene is added to the reaction mixture, preferably as a solution in an aromatic hydrocarbon, together with additional catalyst, and the condensation is continued at a temperature of again 80°–120° C, preferably 90°–110° C.

On completion of the condensation, the resulting condensation product is reacted with a bicyclic or monocyclic reactive terpene which may be, for example, $\alpha$- or $\beta$-pinene, limonene, dipentene, isolimonene, camphene, and the like.

The molar ratio of reactive terpene added in this step (step c) to amount of carene added in the previous 2nd condensation step (step b) is comprised between 0.5 and 5, preferably between 2 and 4.

It should be noted that, for the aforementioned reactions, the carene should be separated from the reactive terpene; i.e., that the reaction between the carene and the phenol should be effected substantially in the absence of the reactive terpene, which, in the case where the raw material used is derived from oils from papermaking plants which include both carene and α-pinene, requires a prior fractionation to effect maximum removal of the α-pinene from the carene.

The condensation reaction with the reactive terpene is preferably effected at a temperature of the same order as that of the first two steps, i.e., between 80° and 120° C.

The above described procedure gives, in a very high yield, a terpene-phenol resin having a pure stable color and a satisfactory softening point of the order of 95°–97° C according to the standard Ring and Ball Test (NF.T 66008 specifications). Said resins, which are soluble in most non hydroxylic organic solvents, have an excellent compatibility with many elastomers and artificial resins. They are thermally stable and resistant to oxidation and find particularly useful applications in the field of adhesives; they are also found to be superior to the conventional resins, particularly to the polyterpenic resins. The resulting resins have a very low polarity.

To prevent such problems as the discoloration of the finished product or corrosion problems, it is preferred, on completion of the reaction, to remove the residual acid catalyst which may be present in the resin withdrawn from the third step.

Said removal may be effected by any suitable means, typically by addition at an elevated temperature (of about 100° C) of lime to which an absorbent earth is added, which results in the removal of both the acidity and the coloring matter which may be present in the resin.

Removal of the solvent is effected on the material leaving the third step, by distillation in vacuo or at atmospheric pressure; said distillation makes it possible to remove also a small top fraction consisting of side-products such as diterpenes and some very low molecular weight terpene-phenols.

The process of this invention is particularly valuable in that the phenol is entirely consumed, together with all the other reagents used. The solvent alone is recoverable. This constitutes a very substantial economic advantage from the standpoints of financial returns, safety and environmental pollution.

The following non limiting examples are given to illustrate the invention.

EXAMPLE 1 a. The following ingredients are added in a stainless steel reactor:

| | | |
|---|---|---|
| Phenol | 12 | kg |
| Toluene | 10 | kg |
| Boron trifluoride (acetic complex) | 0.200 | kg |

After which

| | |
|---|---|
| Carene | 8.400 kg | is slowly added at 60° C, while maintaining the temperature at this level by cooling, if necessary.

When the addition is complete, the temperature is increased to 100° C and the cooking procedure is maintained during 2 hours at said temperature.

b. The following materials are then added, at 100° C:

| | | |
|---|---|---|
| Boron trifluoride complex | 0.300 | kg |
| Toluene | 5 | kg |
| Carene (gradual addition) | 8.400 | kg | and, after condensation of the total amount of carene, c.

| | |
|---|---|
| α-pinene | 31.200 kg | is added and the mixture is then cooked at 120° C during 3 hours.

The resulting material is diluted with 15–20 kg toluene and is then treated at 100° C with:

| | |
|---|---|
| lime | 0.5 kg |
| absorbent earth | 1.6 kg |
| filtering aid | 0.1 kg. |

The filtered material is distilled in vacuo or at atmospheric pressure and is suitably stripped of its solvent and of the small top fraction consisting of diterpenes and of very low molecular weight terpene-phenols.

A very clear resin, having a pure stable color, is removed from the distillation apparatus. The yield is 90–92%, with a Ring and Ball test value of 95°–97° C.

The above resin has the following characteristics:

| | |
|---|---|
| Grade | 3A to Crystal |
| Acidity | Zero |
| Ring and Ball | 95° – 97° C |
| Hydroxyl number | 20 – 30 |
| Average molecular weight | about 600 |

The grade indicated is given in the French Color Scale for naturally occurring rosins.

Said resin is very readily soluble in most solvents (aliphatic and benzenic hydrocarbons, ketones, esters, chlorinated solvents, higher alcohols, and the like) except methanol and ethanol.

It has an excellent compatibility with many elastomers and synthetic resins such as natural rubber, SBR rubber, neoprene, the polyisobutylenes, ethylene/vinyl acetate copolymers, some polyamides, polyethylene waxes, common naturally occuring resins, petroleum derived resins such as isoprene-piperylene copolymers, polyterpenic resins, ester-gums and various esters of modified or unmodified rosins, and the like.

In view of its thermal stability and its resistance to oxidation under pressure, this resin is outstandingly applicable in the field of adhesives, hot-melts, and self-adhesives in which it is found to be superior to conventional resins, particularly to the conventional polyterpenic resins.

EXAMPLE 2

The procedure of Example 1 is used, except that the α-pinene is substituted with the same amount of 95% pure β-pinene (commercial grade). A resin of substantially the same quality as that obtained from α-pinene is obtained in a yield of 92%.

EXAMPLE 3

The procedure of Example 1 is repeated, except that the α-pinene is substituted with a rectification cut having the following composition:

| α-Pinene | 22 – 23% |
|---|---|
| Pyronenes | 40 – 43% |
| Dipentene | 25 – 26% |
| Miscellaneous | 8 – 10% |

A resin having a Ring and Ball value of 98° C is obtained in a yield of 92%.

EXAMPLE 4

The procedure of Example 1 is repeated, except that the α-pinene is substituted, on a weight-for-weight basis, with isolimonene or 2,8-p.menthadiene, to give, in a yield of 82%, a 2A grade resin having a Ring and Ball value of 95° C.

EXAMPLE 5

The procedure of Example 1 is used, except that the α-pinene is substituted on a weight-for-weight basis with limonene, to give, in a yield of 83–85%, a resin having the same Ring and Ball value as the resin of Example 1.

EXAMPLE 6

The procedure of Example 1 is used, except that the α-pinene is substituted with camphene on a weight-for-weight basis, to give, in a yield of 88–90%, a resin having a Ring and Ball value of the same order as the resin of Example 1.

EXAMPLE 7

The procedure of Example 1 is repeated, except that the 12 kg of phenol are substituted with 13.6 kg meta-cresol, all other reagents and treatment conditions being the same, to give a soft, very clear resin having excellent tack properties and which is highly stable, exhibiting the following characteristics:

| Yield | 84% |
|---|---|
| Hydroxyl number | 14 |
| Acidity | Zero |
| Average molecular weight | about 500 |

EXAMPLE 8

To show the influence of the molar ratio π reactive terpene/carene, a number of tests were conducted with the product obtained in step (a) of Example 1, using various α-pinene/ $\Delta^3$-carene ratios.

The results obtained are tabulated in the following Table.

TABLE

| Products | | Amounts (kg) | π | Resin (Yield %) | Ring and Ball value (° C) |
|---|---|---|---|---|---|
| (1) | $\Delta^3$-carene | 20 | 0.75 | 83.5 | 95° |
| (2) | α-pinene | 15 | 1.33 | 84.6 | 95° |
|  | $\Delta^3$-carene | 15 | | | |
| (3) | α-pinene | 20 | 2.5 | 87.5 | 95° |
|  | $\Delta^3$-carene | 10 | | | |
| (4) | α-pinene | 25 | 3.7 | >90 | 95° |
|  | $\Delta^3$-carene | 8.4 | | | |
| (Ex.1) | α-pinene | 31.2 | | | |

Having now described our invention what we claim as new and desire to secure by Letters Patent is:

1. Process for the preparation of terpene-phenol resins by reaction of a carene with a phenol in the presence of an acidic condensation catalyst, comprising:
    a. reacting at a temperature of 80°–120° C one molar proportion of a phenol having at least two reactive sites with 0.4–0.6 molar proportion of a carene, in the presence of an acidic condensation catalyst selected from a Lewis acid type catalyst and a Friedel-Crafts type catalyst:
    b. reacting at a temperature of 80°–120° C the reaction product from step (a) with 0.4–0.6 molar proportion of said carene, in the presence of said catalyst, said carene being added in steps (a) and (b) at a temperature of 20°–100° C; and
    c. subsequently reacting at a temperature of 80°–120° C the product from step (b) with a reactive terpene, the molar ratio of reactive terpene to amount of carene added in step (b) being comprised within the range from 0.5 to 5; steps (a)–(c) being carried out under an inert gaseous atmosphere and in the presence of an aromatic hydrocarbon solvent; thereby obtaining a terpene-phenol resin of clear stable color having a Ring and Ball melting point range of 95°–98° C.

2. Process as claimed in claim 1, wherein the residual catalyst, if any, is removed from the product obtained in step (c).

3. Process as claimed in claim 1, wherein the phenol is selected from the group consisting of hydroxybenzene, the cresols, the xylenols and thymol.

4. Process as claimed in claim 1, wherein the carene is selected from the group consisting of $\Delta^3$-carene, $\Delta^2$-carene, a carene fraction containing from about 55 to about 95% carene derived from pine-resin oils and a carene fraction containing from about 55 to about 95% carene derived oils from papermaking plants.

5. Process as claimed in claim 1, wherein the reactive terpene is selected from the group consisting of α- and β-pinene, limonene, isolimonene, dipentene, camphene and mixtures thereof.

6. Process as claimed in claim 1, wherein the aromatic hydrocarbon is toluene.

7. Process as claimed in claim 1, wherein the catalyst comprises boron trifluoride.

8. Process as claimed in claim 1, wherein a portion of the catalyst is added in step (a) and the remainder is added in step (b).

* * * * *